United States Patent
Koyama et al.

(10) Patent No.: US 8,034,846 B2
(45) Date of Patent: Oct. 11, 2011

(54) METHOD FOR PRODUCING MODIFIED ZIRCONIUM OXIDE-TIN OXIDE COMPOSITE SOL

(75) Inventors: Yoshinari Koyama, Sodegaura (JP); Motoko Asada, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 354 days.

(21) Appl. No.: 12/308,948

(22) PCT Filed: Jul. 11, 2007

(86) PCT No.: PCT/JP2007/063823
§ 371 (c)(1),
(2), (4) Date: Dec. 30, 2008

(87) PCT Pub. No.: WO2008/007708
PCT Pub. Date: Jan. 17, 2008

(65) Prior Publication Data
US 2009/0308282 A1    Dec. 17, 2009

(30) Foreign Application Priority Data
Jul. 14, 2006  (JP) .................. 2006-194067

(51) Int. Cl.
*B01F 3/12*    (2006.01)
*C01G 25/00*   (2006.01)
(52) U.S. Cl. ..................... 516/90; 106/286.4
(58) Field of Classification Search ............ 516/90; 106/286.4
See application file for complete search history.

(56) References Cited

U.S. PATENT DOCUMENTS

| | | | |
|---|---|---|---|
| 5,094,691 A | 3/1992 | Watanabe et al. | |
| 5,460,738 A | 10/1995 | Watanabe et al. | |
| 6,355,694 B1 | 3/2002 | Suzuki et al. | |
| 2005/0209346 A1 | 9/2005 | Koyama et al. | |
| 2006/0025518 A1 | 2/2006 | Koyama et al. | |
| 2006/0116429 A1* | 6/2006 | Koyama et al. ........ | 516/92 |

FOREIGN PATENT DOCUMENTS

| | | |
|---|---|---|
| JP | B2-57-11848 | 3/1982 |
| JP | A-59-232921 | 12/1984 |
| JP | A-60-41536 | 3/1985 |
| JP | A-61-227918 | 10/1986 |
| JP | A-3-217230 | 9/1991 |
| JP | A-6-24746 | 2/1994 |
| JP | A-2000-281344 | 10/2000 |
| JP | A-2001-123115 | 5/2001 |
| JP | A-2005-15324 | 1/2005 |
| JP | A-2005-296940 | 10/2005 |
| JP | A-2006-176392 | 7/2006 |
| WO | WO 2006-019004 A1 | 2/2006 |

* cited by examiner

*Primary Examiner* — Ling Choi
*Assistant Examiner* — Chun-Cheng Wang
(74) *Attorney, Agent, or Firm* — Oliff & Berridge, PLC

(57) ABSTRACT

It is intended to provide a stable sol containing zirconium oxide-tin oxide composite colloids to be used for improving the performance such as abrasion resistance, transparency, adhesiveness, water resistance or weather resistance of a dried film obtained by applying a hard coating agent containing colloidal particles to the surface of plastic lens. A production method includes the steps of obtaining a sol containing colloidal particles (A1) in which the surface of particles in a sol containing hydrothermally-processed zirconium oxide-tin oxide composite colloids (A) is coated with amine-containing $Sb_2O_5$ colloidal particles; obtaining a sol containing colloids (A2) coated with amine-containing $Sb_2O_5$ colloidal particles by performing a hydrothermal treatment at a temperature of from 200 to 350° C.; and mixing the sol containing the colloidal particles (A2) and a sol containing tungsten oxide-tin oxide-silicon dioxide composite colloidal particles (B2) and aging the resulting aqueous medium at 20 to 100° C.

8 Claims, No Drawings

METHOD FOR PRODUCING MODIFIED ZIRCONIUM OXIDE-TIN OXIDE COMPOSITE SOL

TECHNICAL FIELD

The present invention relates to a method for producing a sol containing zirconium oxide-tin oxide composite colloidal particles. A sol containing zirconium oxide-tin oxide composite colloidal particles obtained by the production method of the present invention is used in various applications as a hard coating agent component or primer component applied to a surface of a plastic lens.

BACKGROUND ART

For improving the surface of a plastic lens which has become frequently used in recent years, a sol of metal oxides having high refractive index is used as a component of a hard coating agent applied to this surface.

Proposed is a stable sol containing modified metal oxide colloids having a particle diameter of 4.5 to 60 nm which is formed by coating the surface of colloidal particles of metal oxides having a valence of 3, 4 or 5 which has a particle diameter of 4 to 50 nm as a core with tungsten oxide-tin oxide composite colloidal particles having a particle diameter of 2 to 7 nm in which the mass ratio of $WO_3/SnO_2$ is 0.5 to 100, in which the content of all of these metal oxides is 2 to 50% by mass (for example, see Patent Document 1).

Proposed is a stable sol of a modified $SnO_2$—$ZrO_2$ composite containing particles having a structure in which the surface of $SnO_2$—$ZrO_2$ composite colloidal particles having a mass ratio of $ZrO_2/SnO_2$ of 0.02 to 1.0 and a particle diameter of 4 to 50 nm as a core are coated with $WO_3$—$SnO_2$ composite colloidal particles having a mass ratio of $WO_3/SnO_2$ of 0.5 to 100 and a particle diameter of 2 to 7 nm (for example, see Patent Document 2).

Proposed is a stable sol containing: a structure in which colloidal particles of tin oxide and colloidal particles of zirconium oxide are bonded to each other in a ratio of $ZrO_2/SnO_2$ of 0.02 to 1.0 based on the mass of these oxides; and modified tin oxide-zirconium oxide composite colloidal particles having a particle diameter of 4.5 to 60 nm which is formed by coating the surface of tin oxide-zirconium oxide composite colloidal particles having a particle diameter of 4 to 50 nm as a core with tungsten oxide-tin oxide-silicon dioxide composite colloidal particles having a $WO_3/SnO_2$ mass ratio of 0.1 to 100, a $SiO_2/SnO_2$ mass ratio of 0.1 to 100 and a particle diameter of 2 to 7 nm, in which the content of all of these metal oxides is 2 to 50% by mass (for example, see Patent Document 3).

Proposed is a stable sol containing: a structure in which colloidal particles of tin oxide obtained by a reaction between metal tin, an organic acid and hydrogen peroxide and colloidal particles of zirconium oxide are bonded to each other in a ratio of $ZrO_2/SnO_2$ of 0.02 to 1.0 based on the mass of these oxides; and modified tin oxide-zirconium oxide composite colloidal particles having a particle diameter of 4.5 to 60 nm which is formed by coating the surface of tin oxide-zirconium oxide composite colloidal particles having a particle diameter of 4 to 50 nm as a core with tungsten oxide-tin oxide-silicon dioxide composite colloidal particles having a $WO_3/SnO_2$ mass ratio of 0.1 to 100, a $SiO_2/SnO_2$ mass ratio of 0.1 to 100 and a particle diameter of 2 to 7 nm, in which the content of all of these metal oxides is 2 to 60% by mass (for example, see Patent Document 4).

Proposed is a production method of a metal oxide sol, characterized in that the method includes: a step for heating a metal compound in an aqueous medium containing a carbonate salt of quaternary ammonium at 60 to 110° C.; and a step for performing a hydrothermal processing at 110 to 250° C. (For example, see Patent Document 5).

[Patent Document 1]
  Japanese Patent Application Publication No. JP-A-3-217230 (claims)
[Patent Document 2]
  Japanese Patent Application Publication No. JP-A-6-24746 (claims)
[Patent Document 3]
  Japanese Patent Application Publication No. JP-A-2000-281344 (claims)
[Patent Document 4]
  Japanese Patent Application Publication No. JP-A-2005-296940 (claims)
[Patent Document 5]
  WO 06/019004 Pamphlet

DISCLOSURE OF THE INVENTION

Problems to be Solved by the Invention

When a conventional metal oxide sol, particularly a cationic metal oxide sol is used as a component of a hard coating agent, not only the stability of the obtained hard coating agent is unsatisfactory, but also the transparency, adhesiveness, weather resistance, or the like of a cured coating film of this hard coating agent is unsatisfactory.

The present invention is to provide a sol for further improving a state in which a modified metal oxide is made to be a hard coating film, for example abrasion resistance, transparency, adhesiveness, water resistance and weather resistance which is a stable zirconium oxide-tin oxide composite colloidal sol which is stable and has a high refractive index (1.9 or more) in a wide pH range, and to provide a metal oxide sol capable of being used in a coating for hard coating by mixing it with a silane coupling agent as a performance improving component of a hard coating film which is applied to a plastic lens surface.

Means for Solving the Problems

The present invention provides, according to a first aspect, a production method of an aqueous sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A2) having a particle diameter of 2.5 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A2) is 0.02 to 1 based on the mass ratio of these metal oxides. The production method includes the following steps (a), (b), (c), (d) and (e):

step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;

step (b): obtaining a sol containing zirconium oxide-tin oxide composite colloidal particles (A1) containing amine-containing $Sb_2O_5$ by coating the particle surface of the sol containing zirconium oxide-tin oxide composite colloidal particles (A) obtained in the step (a) with amine-containing $Sb_2O_5$ colloidal particles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;

step (c): obtaining a sol containing zirconium oxide-tin oxide composite colloidal particles (A2) coated with amine-containing $Sb_2O_5$ by subjecting the sol containing zirconium oxide-tin oxide composite colloidal particles (A1) containing amine-containing $Sb_2O_5$ obtained in the step (b) to a hydrothermal treatment at a temperature of 200 to 350° C. for 0.1 to 50 hours;

step (d): preparing a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and a $SiO_2/SnO_2$ mass ratio of 0.1 to 100 and by removing cations existing in the aqueous solution; and step (e): mixing the sol obtained in the step (c) containing zirconium oxide-tin oxide composite colloidal particles (A2) containing amine-containing $Sb_2O_5$ with the sol obtained in the step (d) containing tungsten oxide-tin oxide-silicon dioxide composite colloidal particles (B2) in a ratio of 0.02 to 1 based on the mass ratio of (B2)/(A2) as converted into these metal oxides, and aging the obtained aqueous medium at 20 to 100° C. for 0.1 to 50 hours;

according to a second aspect, a production method of an aqueous sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A1) having a particle diameter of 2.5 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A1) is 0.02 to 1 based on the mass ratio of these metal oxides including the following steps (a), (b), (d) and (e):

step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;

step (b): obtaining zirconium oxide-tin oxide composite colloidal particles (A1) coated with amine-containing $Sb_2O_5$ by coating the particle surface of the sol containing zirconium oxide-tin oxide composite colloidal particles (A) obtained in the step (a) with amine-containing $Sb_2O_5$ colloidal particles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;

step (d): preparing a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and a $SiO_2/SnO_2$ mass ratio of 0.1 to 100 and by removing cations existing in the aqueous solution; and step (e): mixing the sol obtained in the step (b) containing zirconium oxide-tin oxide composite colloidal particles (A1) coated with amine-containing $Sb_2O_5$ with the sol obtained in the step (d) containing tungsten oxide-tin oxide-silicon dioxide composite colloidal particles (B2) in a ratio of 0.02 to 1 based on the mass ratio of (B2)/(A1) as converted into these metal oxides, and aging the obtained aqueous medium at 20 to 100° C. for 0.1 to 50 hours;

according to a third aspect, in the production method according to the first aspect or the second aspect, the carbonate salt of quaternary ammonium is $(NR_4)_2CO_3$, $NR_4HCO_3$ (in these chemical formulae, R represents a hydrocarbon group) or a mixture thereof;

according to a fourth aspect, in the production method according to the first aspect or the second aspect, the carbonate salt of quaternary ammonium is tetramethylammonium hydrogencarbonate;

according to a fifth aspect, in the production method according to any one of the first aspect to the fourth aspect, the zirconium compound is zirconium oxycarbonate;

according to a sixth aspect, in the production according to any one of the first aspect to the fifth aspect, the tin compound is metastannic acid;

according to a seventh aspect, a production method of an organo sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A2) having a particle diameter of 2.5 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A2) is 0.02 to 1 based on the mass ratio of these metal oxides including after the completion of the above steps (a), (b), (c), (d) and (e), the following step (f):

step (f): replacing an aqueous medium of the aqueous sol obtained in the step (e) containing modified zirconium oxide-tin oxide composite colloidal particles (C), with an organic solvent; and according to an eighth aspect, a production method of an organo sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A1) having a particle diameter of 2.5 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A1) is 0.02 to 1 based on the mass ratio of these metal oxides including after the completion of the above steps (a), (b), (d) and (e), the following step (f):

step (f): replacing an aqueous medium of the aqueous sol obtained in the step (e) containing modified zirconium oxide-tin oxide composite colloidal particles (C).

Effects of the Invention

According to the production method of the present invention, by reacting a zirconium compound and a tin compound in the presence of a carbonate salt of quaternary ammonium in an aqueous medium and by subjecting a liquid medium to a hydrothermal treatment while using the obtained mixed or composite zirconium oxide and tin oxide as raw materials, an excellent metal oxide sol excellent in compatibility, dispersibility, or the like which are various drawbacks of conventional metal oxide colloids, particularly in which light (weather) resistance has been improved can be obtained.

Tin oxide in the composite colloidal particles used as a core in the present invention is used for controlling the particle diameter of zirconium oxide. The amount ratio of tin oxide is preferably 0.02 to 0.4 as a molar ratio of $SnO_2/ZrO_2$ and may be more than this range, however in this case, the light resistance which is excellent property of $ZrO_2$ is impaired, which is not preferred. In addition, when the amount ratio of tin oxide is less than this range, the effect of controlling the particle diameter cannot be markedly exhibited, which is also not preferred.

It is known that generally, when the production of zirconium oxide by a hydrolysis method is performed only by heating, the aging of the reaction takes much time. As the result of making extensive and intensive studies, it is found that during the hydrolysis of a zirconium salt, by adding and conjugating tin oxide or a precursor thereof, the hydrolysis becomes easy and the particle diameter can be controlled.

The object of the present invention is to provide a sol capable of being used by mixing it in a hard coating or a coating for a primer as a component for improving the performance of a hard coating film.

When the zirconium oxide-tin oxide composite sol of the present invention is used by mixing it in a hard coating or a coating for a primer as a component for improving the performance of a hard coating film applied to the surface of a plastic lens, problems caused due to an irradiation of ultraviolet rays when a conventional metal oxide sol is used such as yellowing, poor water resistance and poor compatibility can be overcome.

The sol of zirconium oxide-tin oxide composite colloidal particles according to the present invention is colorless and transparent and exhibits a refractive index calculated with respect to a dried coating thereof of ca. 1.85 to 1.95. In addition, the sol has high bonding strength and high hardness and is advantageous in weather resistance, antistatic property, heat resistance, wear resistance, and the like. Particularly, weather resistance and moisture resistance of the sol are extremely improved in comparison with those of a conventional sol.

This sol is stable in a pH range of 1 to 10, preferably 2 to 9 and has a sufficient stability when supplied as the industrial products.

The sol of the present invention having such characteristics is particularly effective as a component for improving such properties as refractive index, dyeing affinity, chemicals resistance, water resistance, moisture resistance, light resistance, weather resistance, wear resistance, or the like for forming a hard coating film on the surface of a plastic lens, and can also be used in other various applications.

By applying these sols to the surface of organic fibers, fiber materials, papers, or the like, flame retardancy, surface slip preventing property, antistatic property, dyeing affinity, or the like of these materials can be improved. In addition, these sols can be used as a binder for ceramic fiber, glass fiber, ceramics, or the like. Further, by using the sols through mixing the sols in various paints, various adhesives, or the like, water resistance, chemicals resistance, light resistance, weather resistance, wear resistance, flame retardancy, or the like of the cured coating films can be improved. Otherwise, generally, these sols can be used as a surface treating agent for metal materials, ceramics materials, glass materials, plastic materials, or the like and are also useful as catalyst components.

The sol obtained according to the present invention can be used in an impact absorbing film for an eyeglass lens. The impact absorbing film improves impact resistance. This impact absorbing film is constituted with the sol according to the production method of the present invention and polyacrylic acid-based resins, polyvinyl acetate-based resins, polyvinyl alcohol-based resins, or the like.

In addition, a cured film on an eyeglass lens containing a coating composition using the sol obtained by the present invention can be used in a reflecting film as a high refractive index film and further, by adding functional components such as anticlouding, photochromic and antifouling components thereto, the resultant film can also be used as a multi-functional film.

Optical members having a cured film containing a coating composition containing the sol obtained by the present invention and a silane coupling agent (for example, a silane coupling agent such as γ-glycidoxypropyltrimethoxysilane, and hydrolysis products thereof) can be used, for example, in besides an eyeglass lens, a camera lens, a window glass of an automobile, optical filters attached to a liquid crystal display, a plasma display, or the like.

BEST MODES FOR CARRYING OUT THE INVENTION

The aqueous sol of the present invention containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A2) having a particle diameter of 2 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A2) is 0.02 to 1 based on the mass ratio of these metal oxides, can be obtained through consecutive steps containing the following steps (a), (b), (c), (d) and (e).

The step (a) is a step in which a zirconium compound and a tin compound in a ratio converted into a molar ratio of $SnO_2/ZrO_2$ of 0.02 to 0.4 are heated in an aqueous medium containing a carbonate salt of quaternary ammonium at 60 to 110° C. and the obtained aqueous medium is subjected to a hydrothermal treatment at 110 to 300° C. to form a sol containing zirconium oxide-tin oxide composite colloidal particles (A).

Examples of the carbonate salt of quaternary ammonium include $(NR_4)_2CO_3$ and $NR_4HCO_3$ and these compounds can be used individually or in combination thereof. Examples of the quaternary ammonium ion in the carbonate salt of quaternary ammonium include those having a $C_{1-18}$ hydrocarbon group and examples of the hydrocarbon group include a saturated or unsaturated chain hydrocarbon group and an alicyclic or aromatic cyclic hydrocarbon group. Examples of the saturated or unsaturated chain hydrocarbon group include a methyl group, an ethyl group, a propyl group, an isopropyl group, an octyl group, a decyl group, an octadecyl group, an ethynyl group and a propenyl group. In addition, examples of the cyclic hydrocarbon group include a phenyl group, a tolyl group, a styryl group, a benzyl group, a naphtyl group, and an anthryl group. Among them, the quaternary ammonium ion has preferably a $C_{1-4}$ hydrocarbon group, such as a methyl group, an ethyl group, a propyl group, and an isopropyl group, and hydrogen tetramethyl ammonium carbonate composed of four methyl groups is preferably used.

In the present invention, when as the above carbonate salt, a carbonate salt containing another ammonium ion than a quaternary ammonium ion is used, also a stable metal oxide sol cannot be obtained. For example, when a tertiary ammonium ion such as $(CH_3)_3HN$, a secondary ammonium ion such as $(CH_3)_2H_2N$, a primary ammonium ion such as $(CH_3)H_3N$ and an ammonium ion which becomes $NH_4$ are used, a satisfactorily stable metal oxide sol cannot be obtained.

In the step (a) of the present invention, a carbonate salt of quaternary ammonium is added to an aqueous medium to prepare an alkaline aqueous medium. At this time, when instead of a carbonate salt of quaternary ammonium, quaternary ammonium hydroxide is used, a satisfactorily stable metal oxide sol cannot be obtained, but be obtained in a slurry in which two layers are separated. Further, for producing an alkali aqueous medium, when another alkali source, such as sodium hydroxide is used, also a stable hydrolyzed product of a metal compound cannot be obtained, when such a hydrolyzed product is subjected to a hydrothermal treatment, also a stable metal oxide sol cannot be obtained. However, it is possible to use another alkali source in combination with a carbonate salt of quaternary ammonium, such as water-soluble inorganic salts (for example, sodium hydroxide, potassium hydroxide, lithium hydroxide, and ammonia), amines (for example, n-propyl amine, monoethanolamine, and triethanolamine), water-soluble organic bases (for example, monomethyltriethyl ammonium hydroxide, and tetramethyl ammonium hydroxide), and other carbonate salts than a carbonate salt of quaternary ammonium (for example, ammonium carbonate). When an alkali substance is used in combination with a carbonate salt of quaternary ammonium, a mass ratio between a carbonate salt of quaternary ammonium and another alkali substance is preferably (a carbonate salt of quaternary ammonium):(another alkali substance)=1: 0.01 to 1.

In the present invention, a carbonate salt of a quaternary ammonium is commercially available in the form of an aqueous solution having a ratio of 30 to 60% by mass thereof. Particularly, an aqueous solution having a content of a carbonate salt of quaternary ammonium of 44.5% by mass which is converted into a content of quaternary ammonium hydroxide is easily commercially available. The concentration of a carbonate salt of quaternary ammonium is obtained by a method of measuring in a concentration converted into a concentration of quaternary ammonium hydroxide.

Examples of the zirconium compound used in the step (a) include zirconium salts such as zirconium nitrate ($Zr(NO_3)_4$), zirconium oxychloride ($ZrOCl_2$), zirconium oxynitrate ($ZrO(NO_3)_2$), zirconium oxysulfate ($ZrO(SO_4)$), and zirconium oxycarbonate ($ZrO(CO_3)$). However, a zirconium oxy salt is preferred and zirconium oxycarbonate is particularly preferred.

Examples of the tin compound include tin nitrate ($Sn(NO_3)_4$), tin sulfate ($Sn(SO_4)_2$), potassium stannate ($K_2SnO_3$), sodium stannate ($Na_2SnO_3$), orthostannic acid ($H_4SnO_4$), metastannic acid ($H_2SnO_3$), hexahydrooxostannic acid ($H_2(Sn(OH)_6)$), and metastannic acid is preferred.

In the step (a) of the present invention, first, a zirconium salt is heated in an aqueous medium containing a carbonate salt of quaternary ammonium at 60 to 110° C.

An aqueous medium used in the step (a) has a pH of 9 to 12 and has a content of a carbonate salt of quaternary ammonium of 3 to 50% by mass in this aqueous medium. In addition, the amount of a zirconium compound and a tin compound in the aqueous medium is 1 to 20% by mass as converted into ($ZrO_2+SnO_2$). When the heating is performed in the step (a) at 60° C. or less, a satisfactory hydrolysis is not progressed and even when the obtained hydrolyzed product is subjected to a hydrothermal treatment a stable zirconium oxide-tin oxide composite sol cannot be obtained. On the other hand, when the heating is performed at 110° C. or more in the step (a), there becomes no aging time for the hydrolysis and the process enters directly into the hydrothermal treatment, which is not preferred. The step (a) is usually performed for 1 to 20 hours.

In adding a zirconium compound and a tin compound to the aqueous medium containing a carbonate salt of quaternary ammonium, any one of them can be added formerly, however, preferably a zirconium compound is formerly added and the reaction mixture is aged at 60 to 110° C. for 1 to 2 hours, followed by adding a tin compound and heating the reaction mixture at 60 to 110° C. for 4 to 6 hours to thereby obtaining an aqueous medium containing a zirconium compound and a tin compound.

The zirconium compound and the tin compound can be added individually to an aqueous solution containing a carbonate salt of quaternary ammonium in a form of either a powder or an aqueous solution. When the zirconium compound and the tin compound are added individually in an aqueous solution form to an aqueous solution containing a carbonate salt of quaternary ammonium, they can be used in a concentration thereof of 20 to 50% by mass.

The step (a) of the present invention is a step in which the above aqueous medium is subjected to a hydrothermal treatment at 110 to 300° C. When the temperature is 110° C. or less, the hydrothermal treatment becomes unsatisfactory and when the temperature is 300° C. or more, the equipment becomes of large-scale. The hydrothermal treatment is performed using an autoclave apparatus. The hydrothermal treatment in the step (a) is usually performed for 1 to 20 hours. Through this hydrothermal treatment, a hydrolyzed product of the zirconium compound and the tin compound becomes zirconium oxide-tin oxide composite colloidal particles (A). The zirconium oxide-tin oxide composite colloidal particles (A) obtained through this step have a particle diameter of in a range of 2 to 500 nm, preferably 2 to 100 nm, more preferably 2 to 50 nm, as measured by observing using a transmission electron microscope.

A liquid through the step (a) is alkaline of pH 8 to 12. The liquid as it is can be satisfactorily used as a metal oxide sol, however, by adding a step of performing a cleaning of the product with pure water using an ultrafilter device, or the like, unnecessary salts can be removed and a sol containing high-purity alkaline zirconium oxide-tin oxide composite colloidal particles (A) can be obtained.

The alkaline metal oxide sol through the step (a) has such physical properties as pH of 8 to 12, a specific surface of 50 $m^2/g$ to 300 $m^2/g$, a concentration of 3 to 60% by mass, an electric conductivity of 1000 to 10,000 μS/cm, and a viscosity of 1 to 300 mPa·s. In addition, it has also a particle diameter distribution range of 2 to 100 nm.

In addition, during the step (a), though a filtered water containing a carbonate salt of quaternary ammonium is discharged, this filtered water contains only a large amount of the component of a carbonate salt of quaternary ammonium and a slight amount of metal oxide component, and the contained component of a carbonate salt of quaternary ammonium is hardly decomposed and exists in an original form, even after through the step (a). Accordingly, it is possible to use this filtered water individually or in combination with a new carbonate salt of quaternary ammonium as a water-soluble medium newly in the step (a) of the present invention. Thus, by utilizing a filtered water repeatedly, it can be linked to the cost down from the both aspects of the raw material and the waste water treatment.

In the step (a) of the present invention, by reacting multiple metal compounds as the raw material metal compound, a metal oxide sol containing composite metal oxide particles can be obtained.

In the step (b) of the present invention, the above sol containing zirconium oxide-tin oxide composite colloidal particles (A) can be coated with an amine-containing antimony pentaoxide colloid, an oligomer thereof or a mixture thereof (B1). In other words, in the present invention, a sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and zirconium oxide-tin oxide composite colloidal particles (A1) having a particle diameter of 2.5 to 100 nm and containing amine-containing $Sb_2O_5$ which is formed by coating the surface of zirconium oxide-tin oxide composite colloidal particles (A) having a particle diameter of 2 to 100 nm as a core with amine-containing $Sb_2O_5$ colloidal particles having a molar ratio of $M/Sb_2O_5$ (where M represents an amine molecule) of 0.02 to 4.00, an oligomer thereof or a mixture thereof (B1), in which the mass ratio of (B1)/(A) is 0.01 to 0.50 based on the mass ratio of these metal oxides, can be used as a core sol. The sol containing zirconium oxide-tin oxide composite colloidal particles (A1) containing amine-containing $Sb_2O_5$ has a pH of 1 to 10.

The production method of a sol containing zirconium oxide-tin oxide composite colloidal particles (A1) containing amine-containing $Sb_2O_5$ can be obtained by a production method including after the step (a), the step (b):

coating the particle surface of the sol containing zirconium oxide-tin oxide composite colloidal particles (A) obtained in the step (a) with amine-containing $Sb_2O_5$ colloidal particles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, aging the obtained aqueous medium at 20 to 100° C. for 0.1 to 50 hours, and removing electrolytes from the resultant solution.

The above amine-containing antimony pentaoxide colloid, an oligomer thereof or a mixture thereof (B1) can be obtained by the following methods (oxidation method, acid decomposition method, or the like). Examples of the acid decomposition method include a method in which an alkali antimonate is reacted with an inorganic acid and then the reaction product is deflocculated with an amine (Japanese Patent Application Publication No. JP-A-60-41536, Japanese Patent Application Publication No. JP-A-61-227918, Japanese Patent Application Publication No. JP-A-2001-123115) and examples of the oxidation method include a method in which in a coexistence of an amine or an alkali metal, antimony trioxide is oxidized with hydrogen peroxide (JP-B-57-11848, Japanese Patent Application Publication No. JP-A-59-232921) and a method in which antimony trioxide is oxidized with hydrogen peroxide and then an amine or an alkali metal is added to the reaction system.

Examples of the amine in the above amine-containing antimony pentaoxide colloid, an oligomer thereof or a mixture thereof (B1) include ammonium, quaternary ammonium or water-soluble amines. Preferred specific examples thereof include: alkyl amines such as isopropyl amine, diisopropyl amine, n-propyl amine and diisobutyl amine; aralkyl amines such as benzyl amine; alicyclic amines such as piperidine; alkanol amines such as monoethanolamine and triethanolamine; and quaternary ammonium such as tetramethylammonium hydroxide. Particularly, diisopropyl amine and diisobutyl amine are preferred. The molar ratio between an alkali component and antimony pentaoxide in the above amine-containing antimony pentaoxide colloid is preferably $M/Sb_2O_5$ of 0.02 to 4.00. When the molar ratio is less than this range, the stability of the obtained colloid becomes poor, on the other hand when the molar ratio is more than this range, the water resistance of a dried coating obtained using such a sol becomes lowered, which is practically not preferred.

The amine-containing antimony pentaoxide colloidal particles, an oligomer thereof or a mixture thereof (B1) are fine antimony pentaoxide colloidal particles, an oligomer thereof or a mixture thereof. As colloidal particles, observed were colloidal particles having a particle size of 10 nm or less as measured by an electron microscope observation. The oligomer is a polymer, thus cannot be observed by an electron microscope.

In the present invention, the colloidal particles (A) have a particle diameter of 2 to 100 nm and by coating (B1) thereon, zirconium oxide-tin oxide composite colloidal particles (A1) containing amine-containing $Sb_2O_5$ have a particle diameter of 2.5 to 100 nm. This addition of the particle diameter is caused by coating the negatively-charged colloidal particles, an oligomer thereof or a mixture thereof (B1) on the surface of the positively-charged colloidal particles (A) through a chemical bond generated on the surface of the (A). In the present invention, for generating a chemical bond on the surface of particles, there cannot be necessarily obtained modified particles having a particle diameter which is a sum of a particle diameter of the core particles and a particle diameter of the coated particles, that is, the particle diameter of the generated modified particles is somewhat changed depending on the chemical bond.

As the amine component, alkyl amine salts such as diisopropyl amine are preferred and a molar ratio of amine/$Sb_2O_5$ is 0.02 to 4.00.

The step (c) of the present invention is a step in which a sol containing zirconium oxide-tin oxide composite colloidal particles (A1) containing amine-containing $Sb_2O_5$ obtained in the step (b) is subjected to a hydrothermal treatment at 200 to 350° C. for 0.1 to 50 hours to obtain a sol containing zirconium oxide-tin oxide composite colloidal particles (A2) containing amine-containing $Sb_2O_5$. In the present invention, the sol containing zirconium oxide-tin oxide composite colloidal particles (A2) containing amine-containing $Sb_2O_5$ obtained in the step (c) can be used as a core sol. This sol has a pH of 1 to 10. The zirconium oxide-tin oxide composite colloidal particles (A2) containing amine-containing $Sb_2O_5$ obtained in the step (c) have a particle diameter of 2.5 to 100 nm.

In the step (c), the colloidal particles (A2) are obtained by subjecting the sol containing zirconium oxide-tin oxide composite colloidal particles (A1) containing amine-containing $Sb_2O_5$ obtained in the step (b) to a hydrothermal treatment at 200 to 350° C. using an autoclave apparatus, or the like. By this hydrothermal treatment, a sol containing zirconium oxide-tin oxide composite colloidal particles (A2) containing amine-containing $Sb_2O_5$ as a core thereof has a high crystallinity, and as a result, when they are used in a coating agent, the enhancement of the refractive index of the coating can be achieved.

The particle diameter of $WO_3$, $SnO_2$ and $SiO_2$ composite colloidal particles (B2) contained in the sol containing tungsten oxide-tin oxide-silicon dioxide composite colloidal particles (B2) obtained in the step (d) and used as a coating sol of the present invention can be measured by the observation thereof using an electron microscope and are found to be 1 to 50 nm, preferably 2 to 7 nm, most preferably 2 to 5 nm. As the dispersing solvent for the colloidal particles in this sol, any of water and a hydrophilic organic solvent can be used. This sol contains $WO_3$, $SnO_2$ and $SiO_2$ in ratios such as a $WO_3/SnO_2$ mass ratio of 0.1 to 100 and a $SiO_2/SnO_2$ mass ratio of 0.1 to 100. The total concentration of $WO_3$, $SnO_2$ and $SiO_2$ contained in this sol is usually 40% by mass or less, practically preferably 2% by mass or more, preferably 5 to 30% by mass. This sol exhibits a pH of 1 to 9 and is a liquid that is colorless and transparent or has a slight colloidal color. In addition, it is stable for 3 months at room temperature and for one month or more even at 60° C. and there are not such risks as that a precipitate is generated in this sol, and that this sol becomes thickened or causes a gelation.

A production method of a sol containing stable tungsten oxide-tin oxide-silicon dioxide composite colloidal particles (B2) containing tungsten oxide ($WO_3$), tin oxide ($SnO_2$) and silicon dioxide ($SiO_2$) composite colloidal particles which are prepared in the step (d) includes the following steps:

step (d-1): preparing an aqueous solution containing a tungstate, stannate and silicate in such ratios as a $WO_3/SnO_2$ mass ratio of 0.1 to 100 and a $SiO_2/SnO_2$ mass ratio of 0.1 to 100; and step (d-2); removing cations existing in the aqueous solution obtained in the step (d-1).

Examples of the tungstate, stannate and silicate used in the step (d-1) include tungstates, stannates and silicates of alkali metals, ammoniums, amines, or the like. Preferred examples of these alkali metals, ammoniums and amines include Li, Na, K, Rb, Cs, $NH_4$; alkyl amines such as ethylamine, triethylamine, isopropylamine, n-propylamine, isobutylamine, diisobutylamine and di-(2-ethylhexyl)amine; aralkyl amines such as benzylamine; alicyclic amines such as piperidine; and alkanol amines such as monoethanolamine and triethanolamine. Particularly preferred are sodium tungstate ($Na_2WO_4 \cdot 2H_2O$), sodium stannate ($Na_2SnO_3 \cdot 3H_2O$) and sodium silicate (water glass). In addition, an aqueous solution of an alkali metal hydroxide in which tungsten oxide, tungstic acid, stannic acid, silicic acid, or the like is dissolved can be used. Also as the silicates, amino silicates and quaternary ammonium silicates which can be obtained by adding to an activated silicic acid, alkyl amines such as ethylamine, triethylamine, isopropylamine, n-propylamine, isobutylamine, diisobutylamine and di-(2-ethylhexyl)amine, can be used.

Examples of the method of preparing the aqueous solution in the step (d-1) include a method of preparing an aqueous solution by dissolving each powder of tungstate, stannate and silicate in water, a method of preparing an aqueous solution by mixing a tungstate aqueous solution, a stannate aqueous solution and a silicate aqueous solution and a method of preparing an aqueous solution by adding powders of tungstate and stannate and an aqueous solution of silicate to water.

As an aqueous solution of tungstate used in the production of a sol in the step (d), preferred is that having a $WO_3$ concentration of 0.1 to 15% by mass, and also that having more than this concentration can be used.

As an aqueous solution of stannate used in the production of a sol in the step (d), preferred is that having a $SnO_2$ concentration of around 0.1 to 30% by mass, and also that having more than this concentration can be used.

The aqueous solution of a silicate used in the production of the sol of the present invention is preferably that having a $SiO_2$ concentration of around 0.1 to 30% by mass, and also that having more than this concentration can be used.

The preparation of the aqueous solution in the step (d-1) is performed while stirring the reaction system at room temperature (20° C.) to 100° C., preferably at room temperature to around 60° C. The aqueous solutions to be mixed are preferably an aqueous solution having a $WO_3/SnO_2$ mass ratio of 0.1 to 100 and an aqueous solution having a $SiO_2/SnO_2$ mass ratio of 0.1 to 100.

The step (d-2) is a step in which cations present in the aqueous solution obtained in the step (d-1) is removed. Examples of the decationizing treatment method include a method of contacting with a hydrogen-type ion exchanger and a salting out. The hydrogen-type ion exchanger used here is that used generally and a commercially available hydrogen-type cation exchanging resin can be suitably used.

When the aqueous sol obtained through the steps (d-1) and (d-2) has a low concentration, the sol concentration of the aqueous sol can be enhanced by a usual concentration method, for example, an evaporation method, and an ultrafiltration method, as necessary. Particularly preferred is the ultrafiltration method. Also in this concentration, the temperature of the sol is preferably maintained at ca. 100° C. or less, particularly at 60° C. or less.

A sol containing tungsten oxide-tin oxide-silicon dioxide composite colloidal particles (B2) obtained in the step (d) contains composite particles composed of tungsten oxide-tin oxide-silicon dioxide obtained by compounding (solid-dissolving) homogeneously at the atom level tin oxide, tungsten oxide and silicon dioxide. Accordingly, it is not a sol obtained by simply mixing three types of sol of tungsten oxide sol, tin oxide sol and silicon dioxide sol.

Since in the sol containing tungsten oxide-tin oxide-silicon dioxide composite colloidal particles (B2), tungsten oxide-tin oxide-silicon dioxide composite colloidal particles (B2) form a solid solution, even by replacing the solvent, these composite colloidal particles are not decomposed into tungsten oxide particles, tin oxide particles and silicon dioxide particles.

When the sol containing tungsten oxide-tin oxide-silicon dioxide composite colloidal particles (B2) is coated on a substrate to form a coating, water resistance, moisture resistance and weather resistance thereof are improved in comparison with a composite sol of tungsten oxide-tin oxide.

When the $WO_3/SnO_2$ mass ratio of the sol obtained in the step (d) is less than 0.1, the sol is unstable and on the contrary when the mass ratio is more than 100, the sol also does not exhibit stability. Though an oxycarboxylic acid added during the production of the above organo sol from a high-pH aqueous sol contributes to the stability of a sol, when the additive amount thereof is so much as 30% by mass or more based on the total mass of $WO_3$, $SnO_2$ and $SiO_2$ in the sol, the water resistance of a dried coating obtained using such a sol is lowered. Examples of the used oxycarboxylic acid include lactic acid, tartaric acid, citric acid, gluconic acid, malic acid and glycol. In addition, examples of the alkali component include hydroxides of an alkali metal such as Li, Na, K, Rb and Cs; alkyl amines such as $NH_4$, ethylamine, triethylamine, isopropylamine and n-propylamine; aralkyl amines such as benzylamine; alicyclic amines such as piperidine; and alkanol amines such as monoethanolamine and triethanolamine. These alkali components may be used in a combination of two or more types thereof. In addition, these alkali components may be used in a combination with the above acid components. Corresponding to the amount of alkali metals, ammonium, amines, oxycarboxylic acids, or the like in the sol, pH of the sol is changed. When the sol has a pH of less than 1, the sol is unstable and on the other hand when the pH is more than 9, composite colloidal particles of tungsten oxide, tin oxide, and silicon dioxide are likely to be dissolved in a liquid. When the total concentration of $WO_3$, $SnO_2$ and $SiO_2$ in the sol is 40% by mass or more, the sol is also poor in the stability. When this concentration is too law, such a sol is unrealistic and a preferred concentration as an industrial product is 5 to 30% by mass.

When an ultrafiltration method is used as a concentration method, polyanions, ultrafine particles, or the like coexisting in a sol pass through an ultrafiltration film together with water, so that these polyanions, ultrafine particles, or the like which are a cause of the destabilization of a sol can be removed from a sol.

The step (e) of the present invention is a step of mixing at 0 to 100° C., the aqueous sol containing zirconium oxide-tin oxide composite colloidal particles (A2) containing amine-containing $Sb_2O_5$ obtained in the step (c) in an amount of 100 parts by mass as the total of metal oxides ($ZrO_2$, $SnO_2$, and $Sb_2O_5$) contained in this aqueous sol with the sol containing tungsten oxide-tin oxide-silicon dioxide composite colloidal particles (B2) having a particle diameter of 2 to 7 nm, a $WO_3/SnO_2$ mass ratio of 0.1 to 100 and a $SiO_2/SnO_2$ mass ratio of 0.1 to 100 and obtained in the step (d) in a ratio of 2 to 100 parts by mass as the total of metal oxides ($WO_3$, $SnO_2$, and $SiO_2$) contained in this sol.

According to the step (e), by bonding the colloidal particles of tungsten oxide-tin oxide-silicon dioxide composite sol (B2) to the surface of the colloidal particles of zirconium oxide-tin oxide composite aqueous sol (A2) containing amine-containing $Sb_2O_5$ to coat the above surface with the tungsten oxide-tin oxide-silicon dioxide composite colloidal particles, there can be generated zirconium oxide-tin oxide composite colloidal particles (C) modified so that the surface of the above colloidal particles (A2) as a core has properties of the tungsten oxide-tin oxide-silicon dioxide composite. Then, a sol in which these modified zirconium oxide-tin oxide composite colloidal particles (C) are stably dispersed in a liquid medium can be obtained.

In the step (e), after mixing the tungsten oxide-tin oxide-silicon dioxide composite sol prepared in the step (d) with the zirconium oxide-tin oxide composite sol prepared in the step (c), by further adding to the resultant mixture, activated silicic acid stabilized with an amine to stir the resultant mixture for 1 to 3 hours, also a sol in which the composite colloidal particles in the step (e) are dispersed in a liquid medium can be obtained. The activated silicic acid stabilized with an amine can be obtained, for example by cation-exchanging silicate soda thereafter by adding thereto an amine exemplified as follows. Examples of the amine include: alkyl amines such as ethyl amine, triethylamine, isopropylamine, n-propylamine and diisobutylamine; aralkyl amines such as benzyl amine; alicyclic amines such as piperidine; and alkanol amines such as monoethanolamine and triethanolamine. Preferred examples thereof include alkyl amines such as diisobutylamine.

The sol of zirconium oxide-tin oxide composite colloidal particles (C) modified with tungsten oxide-tin oxide-silicon dioxide composite colloidal particles (B2) is obtained by mixing the sol containing zirconium oxide-tin oxide composite colloidal particles (A2) containing amine-containing $Sb_2O_5$ in an amount of 100 parts by mass as metal oxides ($ZrO_2+SnO_2+Sb_2O_5$) contained in this sol with the above sol containing tungsten oxide-tin oxide-silicon dioxide composite colloidal particles (B2) in a ratio of 2 to 100 parts by mass as the total ($WO_3+SnO_2+SiO_2$) contained in this sol, preferably while stirring the resultant mixture strongly.

The modified zirconium oxide-tin oxide composite colloidal particles (C) in the sol obtained by the mixing in the above step (e) can be observed using an electro microscope and have a particle diameter of 2.5 to 100 nm, characteristically 4.5 to 60 nm.

When the concentration of the sol of the modified zirconium oxide-tin oxide composite colloidal particles (C) obtained according to the steps (a) to (e) is desired to be further enhanced, the sol can be concentrated to maximum ca. 50% by mass by an ordinary method, for example an evaporation method, and an ultrafiltration method. In addition, when the pH of the sol is desired to be adjusted, after the concentration, the above hydroxides such as alkali metals, and ammonium, the above amines, oxycarboxylic acids, or the like can be added to the sol. Particularly, a sol in which the total concentration of the above metal oxides ($ZrO_2+SnO_2+Sb_2O_5$) and ($WO_3+SnO_2+SiO_2$) is 10 to 50% by mass, is practically preferred.

The surface of the colloidal particles in the modified zirconium oxide-tin oxide composite sol (C) obtained in the step (e) can be coated with a silane compound such as ethyl silicate, methyl trimethoxy silane, γ-glycidoxy propyltrimethoxy silane or a hydrolyzed product thereof partially or entirely.

When the modified zirconium oxide-tin oxide composite sol obtained by the above mixing is an aqueous sol, by a step (f) of replacing an aqueous medium of the aqueous sol with a hydrophilic organic solvent, an organosol can be obtained. This replacement can be performed by a usual method such as a distillation method, and an ultrafiltration method. Examples of the hydrophilic organic solvent include: lower alcohols such as methyl alcohol, ethyl alcohol and isopropyl alcohol; linear chain amides such as dimethylformamide and N,N'-dimethylacetoamide; cyclic amides such as N-methyl-2-pyrrolidone; and glycols such as ethyl cellosolve, propylene glycol monomethyl ether and ethylene glycol.

The above replacement of water with a hydrophilic organic sojvent can be easily performed by a usual method such as a distillation replacement method, and an ultrafiltration method.

As an alternative method of the present invention, there is a method through the above serial methods (a), (b), (d) and (e).

According to this method, an aqueous sol containing: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which is formed by coating the surface of zirconium oxide-tin oxide composite colloidal particles (A1) having a particle diameter of 2.5 to 100 nm and containing amine-containing $Sb_2O_5$ as a core with tungsten oxide-tin oxide-silicon dioxide composite colloidal particles (B2) having a $WO_3/SnO_2$ mass ratio of 0.1 to 100, a $SiO_2/SnO_2$ mass ratio of 0.1 to 100 and a particle diameter of 2 to 7 nm, in which the mass ratio of (B2)/(A1) is 0.02 to 1 based on the mass ratio of these metal oxides.

This method is a production method in which the step (c) is not performed and after the step (b) of obtaining the zirconium oxide-tin oxide composite colloidal particles (A1) coated with amine-containing $Sb_2O_5$, step (d): generating a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and a $SiO_2/SnO_2$ mass ratio of 0.1 to 100 and by removing cations contained in the prepared aqueous solution; and step (e): mixing the sol obtained in the step (b) containing zirconium oxide-tin oxide composite colloidal particles (A1) coated with amine-containing $Sb_2O_5$ with the sol obtained in the step (d) containing tungsten oxide-tin oxide-silicon dioxide composite colloidal particles (B2) in a ratio of 0.02 to 1 based on the mass ratio of (B2)/(A1) as converted into these metal oxides, and aging the obtained aqueous medium at 20 to 100° C. for 0.1 to 50 hours; are performed. Further, after the step (e), the step (f) can be performed.

In this method, the particles in the core sol have a crystallinity lower than that of the particles in the core sol in the former production method, so that the sol has not a high refractive index, however, the particles of the core sol have high surface reactivity and have high reactivity with the particles of the coated sol, so that a stable composite sol can be obtained.

The zirconium oxide-tin oxide composite colloidal particles (C) modified by coating the surface thereof with tungsten oxide-tin oxide-silicon dioxide composite colloidal particles (B2) according to the present invention are negatively charged in the sol. The zirconium oxide-tin oxide composite colloidal particles (A1 or A2) as the core are negatively charged and the tungsten oxide-tin oxide-silicon dioxide composite colloidal particles (B2) as the coating of the core are also negatively charged.

Even though an electrostatic repulsion is generated between negatively-charged core particles and negatively-charged coated particles, unexpectedly the negatively-charged coated particles are coated around the negatively-charged core particles. It is considered that this is because of such processes that a slight part of $Sb_2O_5$ is dissolved from the zirconium oxide-tin oxide composite colloidal particles (A1 or A2) by an alkali component of amine-containing $Sb_2O_5$ (amine component) existing on the surface of the colloidal particles (A1 or A2) and to the portion from which $Sb_2O_5$ has been dissolved, the tungsten oxide-tin oxide-silicon dioxide composite colloidal particles (B2) are attached to thereby starting the coating, so that the surface of the zirconium oxide-tin oxide composite colloidal particles (A1 or A2) as the core is coated with the tungsten oxide-tin oxide-silicon dioxide composite colloidal particles (B2) to thereby obtaining the modified zirconium oxide-tin oxide composite colloidal particles (C).

The zirconium oxide-tin oxide composite colloidal particles (C) modified by coating the surface of the zirconium oxide-tin oxide composite colloidal particles (A1 or A2) with tungsten oxide-tin oxide-silicon dioxide composite colloidal particles (B2) are not decomposed into (A1 or A2) particles and (B2) particles even in the following step (f): replacing the solvent from an aqueous medium to an organic solvent and also the (B2) particles are not decomposed into each component of tungsten oxide, tin oxide or silicon dioxide. This is apparent from such a measurement that when a sample liquid of any part of an organic solvent sol (organo sol) after replacing the solvent is taken, composition ratios of the (A1 or A2) particles and (B2) particles are not varied. Therefore, it is considered that a chemical bond between these (A1 or A2) particles and (B2) particles is tightly formed.

However, in the case where zirconium oxide-tin oxide composite colloidal particles (A1 or A2) having a particle diameter of 2.5 to 100 nm as the core sol and tungsten oxide-tin oxide-silicon dioxide composite colloidal particles (B2) as the coated sol are mixed, when the total amount of metal oxides ($WO_3+SnO_2+SiO_2$) of the coated sol is less than 2 parts by mass relative to 100 parts by mass of metal oxides ($ZrO_2+SnO_2+Sb_2O_5$) of the core sol, the coating of the surface of the zirconium oxide-tin oxide composite colloidal particles (A1 or A2) as the core with the composite colloidal particles (B2) becomes unsatisfactory. Accordingly, the amount of the tungsten oxide-tin oxide-silicon dioxide composite colloidal particles (B2) to be mixed may be less than the amount for covering the entire surface of the zirconium oxide-tin oxide composite colloidal particles (A1 or A2), however, it should be a minimum amount necessary for generating a stable sol of the modified zirconium oxide-tin oxide composite colloidal particles (C) or more. When an amount more than this amount of the tungsten oxide-tin oxide-silicon dioxide composite colloidal particles (B2) used for the surface coating is used in the above mixing, the obtained sol is not more than a stable mixed sol of the sol of the tungsten oxide-tin oxide-silicon dioxide composite colloidal particles (B2) and the generated sol of the modified zirconium oxide-tin oxide composite colloidal particles (C).

Preferably, for modifying the zirconium oxide-tin oxide composite colloidal particles (A1 or A2) by coating the surface thereof, the amount of the tungsten oxide-tin oxide-silicon dioxide composite colloidal particles (B2) to be used is preferably 100 parts by mass or less as the total of metal oxides ($WO_3+SnO_2+SiO_2$) in the coated sol relative to 100 parts by mass of metal oxides ($ZrO_2+SnO_2+Sb_2O_5$) in the core sol.

The preferred sol containing the modified zirconium oxide-tin oxide colloidal particles (C) according to the present invention has a pH of 3 to 11 and when the pH is less than 3, the sol is likely to be unstable. On the other hand, when the pH is more than 11, the tungsten oxide-tin oxide-silicon dioxide composite colloidal particles (B2) covering the modified zirconium oxide-tin oxide composite colloidal particles (A1 or A2) are likely to be dissolved in the liquid. Further, also when the total concentration of the above metal oxides ($ZrO_2+SnO_2+Sb_2O_5$) and ($WO_3+SnO_2+SiO_2$) in the sol of the modified zirconium oxide-tin oxide composite colloidal particles (C) is more than 60% by mass, such a sol is likely to become unstable. A concentration thereof preferable for the industrial product is around 10 to 50% by mass.

Since the tungsten oxide-tin oxide-silicon dioxide composite colloidal particles (B2) are susceptible to a hydrolysis at higher temperatures, the step (g) for concentrating, pH adjusting, solvent replacing, or the like after the mixing of the step (e) is preferably performed at 100° C. or less.

EXAMPLES

Example 1

Step (a): In a vessel of 1 m$^3$, 251.85 kg of an aqueous solution of tetramethylammonium hydrogen carbonate (manufactured by Tama Chemicals Co., Ltd.; containing 42.4% by mass as converted into tetramethylammonium hydroxide) and 95.6 kg of pure water were charged to prepare a diluted aqueous solution. While stirring this aqueous solution, a powder of zirconium oxycarbonate ($ZrOCO_3$; manufactured by AMR Inc.; containing 40.11% by mass as $ZrO_2$) was added gradually to the aqueous solution to a total amount of 491.85 kg. After the completion of the adding, the resultant mixture was warmed to 85° C. and thereto, 8.23 kg of metastannic acid (manufactured by Showa Kako Corporation; containing 7.08 kg as $SnO_2$) were added gradually to heating-age the resultant mixture at 105° C. for 5 hours. After the completion of the heating-aging, the mixture liquid was in the form of a sol.

Further, the sol was subjected to a hydrothermal treatment at 145° C. for 5 hours. The sol obtained after the completion of the hydrothermal treatment was a sol containing zirconium oxide-tin oxide composite colloidal particles (A) which had a ($ZrO_2+SnO_2$) concentration of 12.86% by mass, a specific gravity of 1.180 and a pH of 10.62.

Next, the sol was washed and concentrated using an ultrafiltration apparatus while adding pure water and 1,040 kg of a sol containing zirconium oxide-tin oxide composite colloidal particles (A) having a concentration of 6.03% by mass, a specific gravity of 1.052 and a pH of 9.43 were obtained. The obtained zirconium oxide-tin oxide composite colloid (A) was measured by an electron microscope and found to have a particle diameter of 5 to 15 nm.

Step (b): In a vessel of 200 L, 25 kg of antimony trioxide (manufactured by Guandong Mikuni Antimony Industries Co., Ltd.; containing 99.5% by mass of $Sb_2O_3$), 124 kg of pure water and 20.6 kg of a 48% potassium hydroxide aqueous solution were added and to the resultant mixture, 20 kg of 35% hydrogen peroxide was gradually added while stirring the mixture. The obtained potassium antimonate aqueous solution had contents of $Sb_2O_5$ of 14.6% by mass and of potassium hydroxide of 5.2% by mass. The molar ratio of $K_2O/Sb_2O_5$ was 1.0.

The obtained potassium antimonate aqueous solution was diluted to a content of 2.4% by mass and was passed through a column filled with a cation-type ion exchanging resin. To the ion-exchanged antimonate solution, 14.9 kg of diisopropylamine were added while stirring to obtain an amine-containing antimony pentaoxide colloid (B1) solution. The solution had concentration of $Sb_2O_5$ of 1.58% by mass and of diisopropylamine of 0.90% by mass and a particle diameter of 1 to 10 nm as measured by a transmission electron microscope observation.

To 384 kg (6.05 kg as $Sb_2O_5$) of the amine-containing antimony pentaoxide colloid (B1) sol, 922 kg (55.0 kg as $ZrO_2+SnO_2$) of the obtained zirconium oxide-tin oxide composite colloidal particles (A) sol diluted with 738 kg of pure water were added while stirring in a ratio of the ($Sb_2O_5/ZrO_2+SnO_2$) mass ratio of 0.11 and mixed, and next, the resultant mixture was heating-aged at 95° C. for 2 hours. Then, a sol containing the zirconium oxide-tin oxide composite colloidal particles (A1) containing amine-containing $Sb_2O_5$ was obtained. The obtained zirconium oxide-tin oxide composite colloidal particles (A1) containing amine-containing $Sb_2O_5$ had a particle diameter of 5 to 20 nm as measured by the electron microscope observation.

Step (c): The sol containing the zirconium oxide-tin oxide composite colloidal particles (A1) containing amine-containing $Sb_2O_5$ obtained in the step (b) was continuously subjected to a hydrothermal treatment at 300° C., under 19.6 MPa and at a flow rate of 660 g/min (reaction tube of 4 L). Then, a sol containing zirconium oxide-tin oxide composite colloidal particles (A2) containing amine-containing $Sb_2O_5$ was obtained. The obtained zirconium oxide-tin oxide composite colloidal particles (A2) containing amine-containing $Sb_2O_5$ had a particle diameter of 5 to 20 nm as measured by the electron microscope observation.

Step (d): 20.68 kg of a sodium silicate aqueous solution (containing 14.6% by mass of $SiO_2$) were dissolved in 157 kg of water and next, in the resultant solution, 2.17 kg of sodium tungstate $Na_2WO_4.2H_2O$ (containing 69.5% by mass of $WO_3$) and 2.72 kg of sodium stannate $Na_2SnO_3.3H_2O$ (containing 55.6% by mass of $SnO_2$) were dissolved. Next, by passing the resultant solution through a column of a hydrogen-type cation exchanging resin (IR-120B), 249 kg of an acidic sol containing the tungsten oxide-tin oxide-silicon dioxide composite colloidal particles (B2) (having a pH of 2.1, contents of $WO_3$ of 0.6% by mass, of $SnO_2$ of 0.6% by mass, of $SiO_2$ of 1.2% by mass, a $WO_3/SnO_2$ mass ratio of 1.0, a $SiO_2/SnO_2$ mass ratio of 2.0) were obtained. The obtained tungsten oxide-tin oxide-silicon dioxide composite colloidal particles (B2) had a particle diameter of 2 to 7 nm as measured by the electron microscope observation.

Step (e): To the sol containing the zirconium oxide-tin oxide composite colloidal particles (A2) containing amine-containing $Sb_2O_5$ obtained in the step (c), the sol containing the tungsten oxide-tin oxide-silicon dioxide composite colloidal particles (B2) (containing 2.4% by mass of $WO_3+SnO_2+SiO_2$) obtained in the step (d) was gradually added and mixed while stirring in a ratio of a ($WO_3+SnO_2+SiO_2$)/($ZrO_2+SnO_2+Sb_2O_5$) mass ratio of 0.1 and next, the resultant mixture was heating-aged at 95° C. for 2 hours to obtain an aqueous sol containing the modified zirconium oxide-tin oxide composite colloidal particles (C). The obtained modified zirconium oxide-tin oxide composite colloidal particles (C) had a particle diameter of 5 to 20 nm as measured by the electron microscope observation.

Step (f): The obtained aqueous sol (diluted liquid) containing the modified zirconium oxide-tin oxide composite colloidal particles (C) was concentrated using an ultrafiltration apparatus to obtain 207 kg of the modified zirconium oxide-tin oxide composite aqueous sol having a high concentration. This sol had a specific gravity of 1.300, a viscosity of 5.0 mPa·s, a pH of 8.8, a particle diameter of 28 nm as measured by the dynamic light scattering method, a particle diameter of 5 to 20 nm as measured by the electron microscope observation and an all metal oxides concentration of 25.1% by mass, and was stable. By the dynamic light scattering method, a particle diameter of particles in the sol is observed and when particles are aggregated to each other, an average particle diameter of the aggregated particles is observed.

By adding continuously about 5,000 L of methanol to about 205 kg of the above aqueous sol containing the modified zirconium oxide-tin oxide composite colloidal particles (C) having a high concentration to distil off water, 120 kg of a methanol sol containing the modified zirconium oxide-tin oxide composite colloidal particles (C) produced by replacing the aqueous sol with methanol were obtained. The modified zirconium oxide-tin oxide composite methanol sol had a particle diameter of 25 nm as measured by the dynamic light scattering method, a particle diameter of 5 to 20 nm as measured by the electron microscope observation, a ($WO_3+SnO_2+SiO_2$)/($ZrO_2+SnO_2+Sb_2O_5$) mass ratio of 0.1, a specific gravity of 1.221, a viscosity of 5.1 mPa·s, a pH of 7.2 (of a same mass mixture with water), a concentration converted into metal oxides of 40.1% by mass and a moisture of 0.49% by mass. This sol exhibited a colloid color, had high transparency and was so stable that after being left for 3 months in cooling (at about 7° C.), there was recognized no anomaly such as sedimentation, white turbidity, and thickening.

Example 2

Step (a): This step was performed in substantially the same manner as in Example 1.

Step (b): To 384 g of a sol (containing 6.05 g of $Sb_2O_5$) containing the amine-containing antimony pentaoxide colloidal particles (B1) obtained in substantially the same manner as that in the step (b) of Example 1, 829.2 g of a sol (containing 50 g of $ZrO_2+SnO_2$) containing the zirconium oxide-tin oxide composite colloidal particles (A) obtained in Example 1 diluted with 837.5 g of pure water were added while stirring in a ratio of the ($Sb_2O_5/ZrO_2+SnO_2$) mass ratio of 0.121 and mixed, and next, the resultant mixture was heating-aged at 95° C. for 2 hours. A sol containing the zirconium oxide-tin oxide composite colloidal particles (A1) containing amine-containing $Sb_2O_5$ was obtained. The obtained zirconium oxide-tin oxide composite colloidal particles (A1) containing amine-containing $Sb_2O_5$ had a particle diameter of 5 to 20 nm as measured by the electron microscope observation.

Step (c): The sol containing the zirconium oxide-tin oxide composite colloidal particles (A1) containing amine-containing $Sb_2O_5$ obtained in the step (b) was subjected to a hydrothermal treatment using a batch-type autoclave apparatus at 240° C. for 4 hours. Then, a sol containing the zirconium oxide-tin oxide composite colloidal particles (A2) containing amine-containing $Sb_2O_5$ was obtained. The obtained zirconium oxide-tin oxide composite colloidal particles (A2) containing amine-containing $Sb_2O_5$ had a particle diameter of 5 to 20 nm as measured by the electron microscope observation.

Step (d): A sol containing the tungsten oxide-tin oxide-silicon dioxide composite colloidal particles (B2) was obtained in substantially the same manner as that in the step (d) of Example 1.

Step (e): To the sol containing the zirconium oxide-tin oxide composite colloidal particles (A2) containing amine-containing $Sb_2O_5$ obtained in the step (c), the sol containing the tungsten oxide-tin oxide-silicon dioxide composite colloidal particles (B2) (containing 2.4% by mass of $WO_3+SnO_2+SiO_2$) obtained in the step (d) was gradually added and mixed while stirring in a ratio of a ($WO_3+SnO_2+SiO_2$)/($ZrO_2+SnO_2+Sb_2O_5$) mass ratio of 0.2 and next, the resultant mixture was heating-aged at 95° C. for 2 hours to obtain an aqueous sol containing the modified zirconium oxide-tin oxide composite colloidal particles (C). The obtained modified zirconium oxide-tin oxide composite colloidal particles (C) had a particle diameter of 5 to 20 nm as measured by the electron microscope observation.

Step (f): The aqueous sol (diluted liquid) containing the modified zirconium oxide-tin oxide composite colloidal particles (C) obtained in the step (e) was concentrated using an ultrafiltration apparatus to obtain 426.9 g of the modified zirconium oxide-tin oxide composite colloidal particles (C) aqueous sol having a high concentration. This sol had a specific gravity of 1.118, a viscosity of 1.7 mPa·s, a pH of 7.4, and a particle diameter of 5 to 20 nm as measured by the electron microscope observation and an all metal oxides concentration of 14.1% by mass, and was stable. By the dynamic light scattering method, a particle diameter of particles in the sol is observed and when particles are aggregated to each other, an average particle diameter of the aggregated particles is observed.

By adding continuously about 8 L of methanol to the obtained aqueous sol containing the modified zirconium oxide-tin oxide composite colloidal particles (C) having a high concentration to distil off water, 140 g of a methanol sol of the modified zirconium oxide-tin oxide composite colloidal particles (C) produced by replacing the aqueous sol with methanol were obtained. The modified zirconium oxide-tin oxide composite methanol sol had a ($WO_3+SnO_2+SiO_2$)/($ZrO_2+SnO_2+Sb_2O_5$) mass ratio of 0.2, a particle diameter of 41 nm as measured by the dynamic light scattering method, a particle diameter of 5 to 20 nm as measured by the electron microscope observation, a specific gravity of 1.210, a viscosity of 4.7 mPa·s, a pH of 7.5 (of a same mass mixture with water), a concentration converted into metal oxides of 40.4% by mass and a moisture of 1.0% by mass. This sol exhibited a colloid color, had high transparency and was so stable that after being left for 3 months at room temperature, there was recognized no anomaly such as sedimentation, white turbidity, and thickening.

Example 3

Step (a): This step was performed in substantially the same manner as in Example 1.

Step (b): To 384 g of a sol (containing 6.05 g of $Sb_2O_5$) of the amine-containing antimony pentaoxide colloidal particles (B1) obtained in substantially the same manner as that in the step (b) of Example 1, 829.2 g of a sol (containing 50 g of $ZrO_2+SnO_2$) of the zirconium oxide-tin oxide composite colloidal particles (A) obtained in the step (a) diluted with 837.5 g of pure water were added while stirring in a ratio of the ($Sb_2O_5/ZrO_2+SnO_2$) mass ratio of 0.121 and mixed, and next, the resultant mixture was heating-aged at 95° C. for 2 hours. Then, a sol containing the zirconium oxide-tin oxide composite colloidal particles (A1) containing amine-containing $Sb_2O_5$ was obtained. The obtained zirconium oxide-tin oxide composite colloidal particles (A1) containing amine-containing $Sb_2O_5$ had a particle diameter of 5 to 20 nm as measured by the electron microscope observation.

Step (c): The sol containing the zirconium oxide-tin oxide composite colloidal particles (A1) containing amine-containing $Sb_2O_5$ obtained in the step (b) was subjected to a hydrothermal treatment using a batch-type autoclave apparatus at 240° C. for 4 hours. Then, a sol containing the zirconium oxide-tin oxide composite colloidal particles (A2) containing amine-containing $Sb_2O_5$ was obtained. The obtained zirconium oxide-tin oxide composite colloidal particles (A2) containing amine-containing $Sb_2O_5$ had a particle diameter of 5 to 20 nm as measured by the electron microscope observation.

Step (d): A sol containing the tungsten oxide-tin oxide-silicon dioxide composite colloidal particles (B2) was obtained in substantially the same manner as that in the step (d) of Example 1.

Step (e): To the sol containing the zirconium oxide-tin oxide composite colloidal particles (A2) containing amine-containing $Sb_2O_5$ obtained in the step (c), the sol containing the tungsten oxide-tin oxide-silicon dioxide composite colloidal particles (B2) (containing 2.4% by mass of $WO_3+SnO_2+SiO_2$) obtained in the step (d) was gradually added and mixed while stirring in a ratio of a ($WO_3+SnO_2+SiO_2$)/($ZrO_2+SnO_2+Sb_2O_5$) mass ratio of 0.05 and next, the resultant mixture was heating-aged at 95° C. for 2 hours to obtain an aqueous sol containing the modified zirconium oxide-tin oxide composite colloidal particles (C). The obtained modified zirconium oxide-tin oxide composite colloidal particles (C) had a particle diameter of 5 to 20 nm as measured by the electron microscope observation.

Step (f): The obtained aqueous sol (diluted liquid) containing the modified zirconium oxide-tin oxide composite colloidal particles (C) obtained in the step (e) was concentrated using an ultrafiltration apparatus to obtain 455.6 g of the modified zirconium oxide-tin oxide composite colloidal particles (C) aqueous sol having a high concentration. This sol had a specific gravity of 1.106, a viscosity of 1.7 mPa·s, a pH of 8.1, and a particle diameter of 5 to 20 nm as measured by the electron microscope observation and an all metal oxides concentration of 11.5% by mass, and was stable. By the dynamic light scattering method, a particle diameter of particles in the sol is observed and when particles are aggregated to each other, an average particle diameter of the aggregated particles is observed.

By adding continuously about 8 L of methanol to the obtained aqueous sol of the modified zirconium oxide-tin oxide composite colloidal particles (C) having a high concentration to distil off water, 125 g of a methanol sol of the modified zirconium oxide-tin oxide composite colloidal particles (C) produced by replacing the aqueous sol with methanol were obtained. The modified zirconium oxide-tin oxide composite methanol sol had a $(WO_3+SnO_2+SiO_2)/(ZrO_2+SnO_2+Sb_2O_5)$ mass ratio of 0.05, a particle diameter of 36 nm as measured by the dynamic light scattering method, a particle diameter of 5 to 20 nm as measured by the electron microscope observation, a specific gravity of 1.202, a viscosity of 3.3 mPa·s, a pH of 6.6 (of a same mass mixture with water), a concentration converted into metal oxides of 40.5% by mass and a moisture of 1.0% by mass. This sol exhibited a colloid color, had high transparency and was so stable that after being left for 3 months in cooling (at about 7° C.), there was recognized no anomaly such as sedimentation, white turbidity, and thickening.

Example 4

The steps (a) to (e) of Example 1 were performed.

Step (f): To 557.8 g of the aqueous sol of the modified zirconium oxide-tin oxide composite colloidal particles (C) having a high concentration obtained in the step (e), 1.4 g of tartaric acid and 2.1 g of diisobutylamine were added while stirring and the stirring was continued further for 30 minutes. Thereafter, by adding continuously about 6.5 L of methanol to this aqueous sol of the modified zirconium oxide-tin oxide composite colloidal particles (C) to distil off water, 340 g of a methanol sol of the modified zirconium oxide-tin oxide composite colloidal particles (C) produced by replacing the aqueous sol with methanol were obtained.

The methanol sol of the modified zirconium oxide-tin oxide composite colloidal particles (C) had a $(WO_3+SnO_2+SiO_2)/(ZrO_2+SnO_2+Sb_2O_5)$ mass ratio of 0.1, a particle diameter of 40 nm as measured by the dynamic light scattering method, a particle diameter of 5 to 20 nm as measured by the electron microscope observation, a specific gravity of 1.222, a viscosity of 2.7 mPa·s, a pH of 6.4 (of a same mass mixture with water) and a concentration converted into metal oxides of 40.3% by mass. This sol exhibited a colloid color, had high transparency and was so stable that after being left for 1 month at room temperature, there was recognized no anomaly such as sedimentation, white turbidity, and thickening.

Comparative Example 1

Step (a): 37.5 kg of oxalic acid $((COOH)_2.2H_2O)$ was dissolved in 363 kg of pure water and the resultant solution was charged in a 500 L vessel and was warmed to 70° C. while stirring, followed by adding 150 kg of 35% hydrogen peroxide water and 75 kg of metal tin (AT-SN, No200N; manufactured by Yamaishi Metal Co., Ltd.) to the solution.

The additions of hydrogen peroxide water and metal tin were performed alternatively. First, 10 kg of 35% hydrogen peroxide water and next, 5 kg of metal tin were added. After waiting for the completion of the reaction of them (for 5 to 10 minutes), this operation was repeated. The time required for the entire addition was 2.5 hours and after the completion of the addition, further 10 kg of 35% hydrogen peroxide water was added, followed by heating the reaction mixture at 90° C. for 1 hour to complete the reaction. The molar ratio of hydrogen peroxide water and metal tin $H_2O_2/Sn$ was 2.60.

The obtained tin oxide sol was extremely excellent in transparency. The tin oxide sol had a yield of 626 kg, a specific gravity of 1.154, a pH of 1.56 and a $SnO_2$ concentration of 14.9%.

The obtained sol was observed by an electron microscope and was found to be particles in the form of a sphere having a size of 10 to 15 nm and having advantageous dispersibility. This sol exhibited rather a tendency of thickening due to being left, however, was stable without recognition of a gelation.

626 kg of the obtained sol was diluted with pure water to the concentration as $SnO_2$ of 5% by mass and thereto, 4.66 kg of isopropylamine was added. The resultant mixture was passed through a column filled with an anion exchanging resin (Amberlite IRA-410) and next, was heating-aged at 95° C. for 1 hour, followed by passing the mixture through a column filled with an anion exchanging resin (Amberlite IRA-410) to obtain 2535 kg of an alkaline tin oxide sol. Next, the obtained sol was subjected to a heating treatment at 140° C. for 5 hours.

Step (b): 300 kg of pure water and 3.3 kg of 35% hydrochloric acid were added to 78.2 kg (containing 13.8 kg of $ZrO_2$) of a zirconium oxychloride aqueous solution (having a $ZrO_2$ concentration of 17.68% by mass) and next thereto, 2529 kg (containing 91.0 kg of $SnO_2$) of an alkaline tin oxide aqueous sol obtained in the step (a) was added at room temperature while stirring the reaction mixture. The resultant mixture was a sol having a $ZrO_2/SnO_2$ mass ratio of 0.15, a colloid color and advantageous transparency.

Step (c): The mixture prepared in the step (b) was subjected to a heating treatment at 95° C. for 5 hours while stirring the mixture and 3471 kg of tin oxide-zirconium oxide composite sol were obtained. This sol had contents of $SnO_2$ of 2.62% by mass, of $ZrO_2$ of 0.40% by mass and of $SnO_2+ZrO_2$ of 3.01% by mass, and a colloid color, however, had advantageous transparency. The obtained tin oxide-zirconium oxide composite sol colloidal particles had a particle diameter of 10 to 25 nm as measured by the electron microscope observation.

Step (d): 49.8 kg of grade 3 sodium silicate aqueous solution (containing 29.3% by mass of $SiO_2$) was dissolved in 898 kg of pure water and next therein, 10.5 kg of sodium tungstate $Na_2WO_4.2H_2O$ (containing 69.8% by mass of $WO_3$) and 13.1 kg of sodium stannate $Na_2SnO_3.3H_2O$ (containing 55.7% by mass of $SnO_2$) were dissolved. Next, by passing the resultant solution through a column of a hydrogen-type cation exchanging resin (IR-120B), 1179 kg of an acidic tungsten oxide-tin oxide-silicon dioxide composite sol (having a pH of 2.0, contents of $WO_3$ of 0.6% by mass, of $SnO_2$ of 0.6% by mass, of $SiO_2$ of 1.2% by mass, and a $WO_3/SnO_2$ mass ratio of 1.0 and $SiO_2/SnO_2$ mass ratio of 2.0) was obtained. The obtained tungsten oxide-tin oxide-silicon dioxide composite sol colloidal particles had a particle diameter of 2 to 7 nm as measured by the electron microscope observation.

Step (e): 3471 kg of the tin oxide-zirconium oxide composite sol (containing 104.8 kg of $ZrO_2+SnO_2$) prepared in the step (c) were added to 1179 kg of the tungsten oxide-tin oxide-silicon dioxide composite sol (containing 29.2 kg of $WO_3+SnO_2+SiO_2$) prepared in the step (d) at room temperature while stirring the reaction mixture over 60 minutes and the stirring was continued further for 10 minutes. The obtained modified tin oxide-zirconium oxide composite sol had a ratio between the tin oxide-zirconium oxide composite colloid ($ZrO_2+SnO_2$) and the tungsten oxide-tin oxide-silicon dioxide composite colloid ($WO_3+SnO_2+SiO_2$) which is a ($WO_3+SnO_2+SiO_2$)/($ZrO_2+SnO_2$) mass ratio of 0.25 and an all metal oxides concentration of 2.9% by mass, and exhibited a tendency of white turbid due to a micro aggregation of colloidal particles. The colloidal particles of the modified tin oxide-zirconium oxide composite sol had a particle diameter of 10 to 25 nm as measured by the electron microscope observation.

Step (f): To 4650 kg of the liquid mixture obtained in the step (e), 2.3 kg of diisobutylamine was added and the resultant mixture was passed through a column filled with a hydroxyl group-type anion exchanging resin (Amberlite 410) at room temperature. Next, by heating-aging the mixture at 90° C. for 1 hour, a modified tin oxide-zirconium oxide composite aqueous sol (diluted liquid) was obtained. This sol had a pH of 9.10 and exhibited a colloid color, however, had advantageous transparency.

The modified tin oxide-zirconium oxide composite aqueous sol (diluted liquid) obtained in the step (f) was concentrated using a filtration apparatus equipped with an ultrafiltration film having a molecular weight cut off of 100,000 at 40 to 50° C. to obtain 358 kg of a modified tin oxide-zirconium oxide composite aqueous sol having a high concentration. This sol had a content of all metal oxides ($ZrO_2+SnO_2+WO_3+SiO_2$) of 31.9% by mass and was stable. In addition, the viscosity of this aqueous sol which has been concentrated to 46.8% by mass of the concentration of the all metal oxides ($ZrO_2+SnO_2+WO_3+SiO_2$) was measured by charging the sample of the concentrated sol in a 100 cc measuring cylinder and by using No. 1 rotor of a B-type viscometer at a rotation number of 60 rpm and was found to be 6.3 mPa·s.

To 358 kg of the above modified tin oxide-zirconium oxide composite aqueous sol having a high concentration, 1.1 kg of tartaric acid, 1.7 kg of diisobutylamine and one drop of an antifoaming agent (SN defoamer 483; manufactured by San Nopco Ltd.) were added at room temperature while stirring and the stirring was continued for 1 hour. By adding 5010 L of methanol to this sol to distil off water using a reaction vessel with a stirrer under normal pressure, 220 kg of a modified tin oxide-zirconium oxide composite methanol sol produced by replacing water in the aqueous sol with methanol were obtained. The obtained modified tin oxide-zirconium oxide composite methanol sol had a ratio between the tin oxide-zirconium oxide composite colloid ($ZrO_2+SnO_2$) and the tungsten oxide-tin oxide-silicon dioxide composite colloid ($WO_3+SnO_2+SiO_2$) which is a ($WO_3+SnO_2+SiO_2$)/($ZrO_2+SnO_2$) mass ratio of 0.25, and the colloidal particles of the modified tin oxide-zirconium oxide composite sol had a particle diameter of 10 to 25 nm as measured by the electron microscope observation.

This sol containing methanol as the solvent had a specific gravity of 1.280, a pH of 6.59 (of a same mass mixture with water), a viscosity of 2.1 mPa·s, a content of all metal oxides ($ZrO_2+SnO_2+WO_3+SiO_2$) of 42.8% by mass, a moisture of 0.43% by mass and a particle diameter of 10 to 25 nm as measured by the electron microscope observation.

This sol exhibited a colloid color, had high transparency and was so stable that at room temperature, there was recognized no anomaly such as sedimentation, white turbidity, and thickening. In addition, a dried product of this sol had a refractive index of 1.85.

(Preparation of Coating Composition 1)

Production of coating composition using methanol sol containing modified zirconium oxide-tin oxide composite colloidal particles (C) obtained in Example 1.

In a glass-made vessel with a magnetic stirrer, 105.3 parts by mass of γ-glycidoxypropyltrimethoxysilane were added and thereto, 36.8 parts by mass of 0.01 N hydrochloric acid were dropped over 3 hours while stirring the mixture. After the completion of the dropping, the mixture was stirred for 0.5 hours to obtain a partially-hydrolyzed product of γ-glycidoxypropyltrimethoxysilane. Next, 216.2 parts by mass of the modified zirconium oxide-tin oxide composite methanol sol (containing 40.1% by mass as converted into all metal oxides) obtained in Example 1 and further, 1.7 parts by mass of aluminum acetylacetonate as a curing agent were added to 142.1 parts by mass of the above partially-hydrolyzed product of γ-glycidoxypropyltrimethoxysilane and further thereto, 68.0 parts by mass of methanol were added. The resultant mixture was thoroughly stirred and then filtered to prepare a coating liquid.

(Formation of Cured Film 1)

A commercially available slide glass plate was prepared and the surface thereof was coated with the above coating composition 1 by a dip-coat method, followed by subjecting the coated glass plate to a heating treatment at 120° C. for 2 hours to cure the coating film. The coating film had a refractive index of 1.60.

(Preparation of Coating Composition 2)

A coating composition 2 was prepared in substantially the same manner as in the above preparation of the coating composition 1, except that the methanol sol of the modified zirconium oxide-tin oxide composite colloidal particles (C) obtained in Example 1 was changed to the methanol sol of the modified tin oxide-zirconium oxide composite sol colloidal particles produced in Comparative Example 1.

(Preparation of Cured Film 2)

A commercially available slide glass plate was prepared and the surface thereof was coated with the above coating composition 2 by a dip-coat method, followed by subjecting the coated glass plate to a heating treatment at 120° C. for 2 hours to cure the coating film. The coating film had a refractive index of 1.57.

(Evaluation of Cured Film)

As a sample for measuring performances of the coating film other than measuring the refractive index thereof, used was the sample prepared by a method including: preparing a commercially available polycarbonate plate having a refractive index of nD=1.59; coating the polycarbonate plate with the above coating composition by a spin coating method; and subjecting the coated plate to a heating treatment at 120° C. for 2 hours to cure the coating film.

In addition, various physical properties of optical members having a cured film obtained in Examples and Comparative Example were measured by the following measuring methods and the results thereof are shown in Table 1.

(1) Abrasion Resistance Test

By rubbing the surface of a cured film with a steel wool #0000, scratch resistance visually evaluated. As the evaluation criteria, the order of scratch resistance is evaluated as A>B>C.

(2) Adhesion Test

The cured film was cross-cut with 1 mm interval into 100 grids and to the grids, an adhesive tape (cellophane tape; manufactured by Nichiban Co., Ltd.) was strongly adhered. Thereafter, the adhesive tape was rapidly peeled and the presence or absence of peeling of the cured film after the peeling of the adhesive tape was examined. A cure film which was not peeled was evaluated as advantageous, and a cured film which was peeled was evaluated as poor.

(3) Warm Water-Resistance Test

The optical member was immersed in a warm water of 80° C. and with respect to this optical member, a test similar to the above adhesion test was performed.

(4) Transparency Test

In a dark room under a fluorescent lamp, whether the cured film has cloudiness or not was visually examined. The evaluation criteria are as follows. A cured film having almost no cloudiness was evaluated as A. A cured film having more cloudiness than the A-evaluated cured film was evaluated as B and a cured film having more cloudiness than the B-evaluated cured film was evaluated as C.

(5) Weather Resistance Test

The obtained optical member was exposed to the outdoor for 1 month and an appearance change of the optical member after the exposure was visually observed. As a result, the presence or absence of the anomaly was described.

TABLE 1

| | Abrasion resistance | Adhesiveness | Warm water resistance | Transparency | Weather resistance |
|---|---|---|---|---|---|
| Example 1 | A | advantageous | advantageous | A | no anomaly |
| Comparative Example 1 | A | advantageous | advantageous | A to B | no anomaly |

INDUSTRIAL APPLICABILITY

According to the present invention, by coating zirconium oxide-tin oxide composite colloidal particles (A) as the core particles with colloidal particles containing amine-containing $Sb_2O_5$, an oligomer thereof or a mixture thereof (B1), obtained are zirconium oxide-tin oxide composite colloidal particles (A1) containing amine-containing $Sb_2O_5$. Then, by subjecting these colloidal particles (A1) to a hydrothermal treatment, colloidal particles (A2) are obtained. The colloidal particles (A1) and the colloidal particles (A2) are coated with a coating material (B1), so that they exhibit high dispersibility in an aqueous medium. Accordingly, the following coating with tungsten oxide-tin oxide-silicon dioxide composite colloidal particles (B2) can be efficiently performed, so that the colloidal particles (B2) are coated on the particle surface of the colloidal particles (A1) and colloidal particles (A2) as a layer having a uniform thickness.

The colloidal particles (A1) and the colloidal particles (A2) are negatively-charged colloidal particles and also the colloidal particles (B2) are negatively-charged colloidal particles, in spite of an electric repulsion between these particles, a composite of core particles and coated particles is formed and the combination of core particles and coated particles is novel.

Since the core particles-coated particles composite is formed by coating with a coating layer having such a uniform thickness, a coating liquid using a sol of such colloidal particles (C) can exhibit high performance in abrasion resistance, adhesiveness, warm water resistance, transparency and weather resistance, for example when the liquid is coated on a surface of a plastic lens for eye glasses.

When the sol obtained according to the present invention is used as a coating film component, a novel particle structure can be formed in comparison with a case where a conventional sol is used as a coating film component. As a result, the refractive index of the sol of the present invention is improved and other physical properties of the sol of the present invention are the same or more than those of a conventional sol. Thus, the sol of the present invention can exhibit sufficient performances as a hard-coating agent for a plastic lens for eye glasses.

The invention claimed is:

1. A production method of an aqueous sol that contains: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which are formed by coating the surface of zirconium oxide-tin oxide composite colloidal particles (A2) as a core having a particle diameter of 2.5 to 100 nm and containing amine-containing $Sb_2O_5$ with tungsten oxide-tin oxide-silicon dioxide composite colloidal particles (B2) having a $WO_3/SnO_2$ mass ratio of 0.1 to 100, an $SiO_2/SnO_2$ mass ratio of 0.1 to 100 and a particle diameter of 2 to 7 nm, the mass ratio of (B2)/(A2) being 0.02 to 1 based on the mass ratio of these metal oxides, the production method comprising step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;

step (b): obtaining a sol containing zirconium oxide-tin oxide composite colloidal particles (A1) containing amine-containing $Sb_2O_5$ by coating the particle surface of the sol containing zirconium oxide-tin oxide composite colloidal particles (A) obtained in step (a) with amine-containing $Sb_2O_5$ colloidal particles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;

step (c): obtaining a sol containing zirconium oxide-tin oxide composite colloidal particles (A2) coated with amine-containing $Sb_2O_5$ by subjecting the sol containing zirconium oxide-tin oxide composite colloidal particles (A1) containing amine-containing $Sb_2O_5$ obtained in step (b) to a hydrothermal treatment at a temperature of 200 to 350° C. for 0.1 to 50 hours;

step (d): preparing a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and an $SiO_2/SnO_2$ mass ratio of 0.1 to 100 and by removing cations existing in the aqueous solution; and step (e): mixing the sol obtained in step (c) containing zirconium oxide-tin oxide composite colloidal particles (A2) containing amine-containing $Sb_2O_5$ with the sol obtained in step (d) containing tungsten oxide-tin oxide-silicon dioxide composite colloidal particles (B2) in a ratio of 0.02 to 1 based on the mass ratio of (B2)/(A2) as converted into these metal oxides, and aging the obtained aqueous medium at 20 to 100° C. for 0.1 to 50 hours to yield the aqueous sol.

2. A production method of an aqueous sol that contains: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C') having a particle diameter of 2.5 to 100 nm which are formed by coating the surface of zirconium oxide-tin oxide composite colloidal particles (A1) as a core having a particle diameter of 2.5 to 100 nm and containing amine-containing $Sb_2O_5$ with tungsten oxide-tin oxide-silicon dioxide composite colloidal particles (B2) having a $WO_3/SnO_2$ mass ratio of 0.1 to 100, an $SiO_2/SnO_2$ mass ratio of 0.1 to 100 and a particle diameter of 2 to 7 nm, the mass ratio of (B2)/(A1) being 0.02 to 1 based on the mass ratio of these metal oxides, the production method comprising:

step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;

step (b): obtaining a sol containing zirconium oxide-tin oxide composite colloidal particles (A1) coated with amine-containing $Sb_2O_5$ by coating the particle surface of the sol containing zirconium oxide-tin oxide composite colloidal particles (A) obtained in step (a) with amine-containing $Sb_2O_5$ colloidal particles having a molar ratio of $M/Sb_2O_2$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;

step (d): preparing a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and an $SiO_2/SnO_2$ mass ratio of 0.1 to 100 and by removing cations existing in the aqueous solution; and step (e'): mixing the sol obtained in step (b) containing zirconium oxide-tin oxide composite colloidal particles (A1) coated with amine-containing $Sb_2O_5$ with the sol obtained in step (d) containing tungsten oxide-tin oxide-silicon dioxide composite colloidal particles (B2) in a ratio of 0.02 to 1 based on the mass ratio of (B2)/(A1) as converted into these metal oxides, and aging the obtained aqueous medium at 20 to 100° C. for 0.1 to 50 hours to yield the aqueous sol.

3. The production method according to claim 1, wherein the carbonate salt of quaternary ammonium is $(NR_4)_2CO_3$, $NR_4HCO_3$ (in these chemical formulae, R represents a hydrocarbon group) or a mixture thereof.

4. The production method according to claim 1, wherein the carbonate salt of quaternary ammonium is tetramethylammonium hydrogencarbonate.

5. The production method according to claim 1, wherein the zirconium compound is zirconium oxycarbonate.

6. The production method according to claim 1, wherein the tin compound is metastannic acid.

7. A production method of an organo sol that contains: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C) having a particle diameter of 2.5 to 100 nm which are formed by coating the surface of zirconium oxide-tin oxide composite colloidal particles (A2) as a core having a particle diameter of 2.5 to 100 nm and containing amine-containing $Sb_2O_5$ with tungsten oxide-tin oxide-silicon dioxide composite colloidal particles (B2) having a $WO_3/SnO_2$ mass ratio of 0.1 to 100, an $SiO_2/SnO_2$ mass ratio of 0.1 to 100 and a particle diameter of 2 to 7 nm, the mass ratio of (B2)/(A2) being 0.02 to 1 based on the mass ratio of these metal oxides, the production method comprising:

step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;

step (b): obtaining a sol containing zirconium oxide-tin oxide composite colloidal particles (A1) containing amine-containing $Sb_2O_5$ by coating the particle surface of the sol containing zirconium oxide-tin oxide composite colloidal particles (A) obtained in step (a) with amine-containing $Sb_2O_5$ colloidal particles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;

step (c): obtaining a sol containing zirconium oxide-tin oxide composite colloidal particles (A2) coated with amine-containing $Sb_2O_5$ by subjecting the sol containing zirconium oxide-tin oxide composite colloidal particles (A1) containing amine-containing $Sb_2O_5$ obtained in step (b) to a hydrothermal treatment at a temperature of 200 to 350° C. for 0.1 to 50 hours;

step (d): preparing a sol containing tungsten oxide-tin oxide-silicon dioxide composite colloidal particles (B2) obtained by preparing an aqueous solution containing tungstates, stannates and silicates in such ratios as a $WO_3/SnO_2$ mass ratio of 0.1 to 100 and an $SiO_{2/SnO2}$ mass ratio of 0.1 to 100 and by removing cations existing in the aqueous solution;

step (e): mixing the sol obtained in step (c) containing zirconium oxide-tin oxide composite colloidal particles (A2) containing amine-containing $Sb_2O_5$ with the sol obtained in step (d) containing tungsten oxide-tin oxide-silicon dioxide composite colloidal particles (B2) in a ratio of 0.02 to 1 based on the mass ratio of (B2)/(A2) as converted into these metal oxides, and aging the obtained aqueous medium at 20 to 100° C. for 0.1 to 50 hours to yield the aqueous sol; and step (f): after step (e), replacing an aqueous medium of the aqueous sol obtained in step (e) containing modified zirconium oxide-tin oxide composite colloidal particles (C), with an organic solvent.

8. A production method of an organo sol that contains: a structure in which colloidal particles of zirconium oxide and colloidal particles of tin oxide are bonded to each other in a ratio of $SnO_2/ZrO_2$ of 0.02 to 0.4 based on the molar ratio of these oxides; and modified zirconium oxide-tin oxide composite colloidal particles (C') having a particle diameter of 2.5 to 100 nm which are formed by coating the surface of zirconium oxide-tin oxide composite colloidal particles (A1) as a core having a particle diameter of 2.5 to 100 nm and containing amine-containing $Sb_2O_5$ with tungsten oxide-tin oxide-silicon dioxide composite colloidal particles (B2) having a $WO_3/SnO_2$ mass ratio of 0.1 to 100, an $SiO_2/SnO_2$ mass ratio of 0.1 to 100 and a particle diameter of 2 to 7 nm, the mass ratio of (B2)/(A1) being 0.02 to 1 based on the mass ratio of these metal oxides, the production method comprising:

- step (a): forming a sol containing zirconium oxide-tin oxide composite colloidal particles (A) by heating at 60 to 110° C., a zirconium compound and a tin compound in a ratio of 0.02 to 0.4 as converted into a molar ratio of $SnO_2/ZrO_2$ in an aqueous medium containing a carbonate salt of quaternary ammonium and by subjecting the obtained aqueous medium to a hydrothermal treatment at 110 to 300° C.;
- step (b): obtaining a sol containing zirconium oxide-tin oxide composite colloidal particles (A1) coated with amine-containing $Sb_2O_5$ by coating the particle surface of the sol containing zirconium oxide-tin oxide composite colloidal particles (A) obtained in step (a) with amine-containing $Sb_2O_5$ colloidal articles having a molar ratio of $M/Sb_2O_5$ (where M represents an amine molecule) of 0.02 to 4.00, an oligomer thereof or a mixture thereof (B1) in a ratio of 0.01 to 0.50 based on the mass ratio of (B1)/(A) as converted into these metal oxides, and by aging the obtained aqueous medium at 20 to 100° C. for 0.1 to 50 hours;
- step (d): preparing a sol containing tungsten oxide-tin oxide-silicon dioxide composite colloidal particles (B2) obtained by preparing an aqueous solution containing tungstates. stannates and silicates in such ratios as a $WO_3/SnO_2$ mass ratio of 0.1 to 100 and an $SiO_2/SnO_2$ mass ratio of 0.1 to 100 and by removing cations existing in the aqueous solution;
- step (e'): mixing the sol obtained in step (b) containing zirconium oxide-tin oxide composite colloidal particles (A1) coated with amine-containing $Sb_2O_5$ with the sol obtained in step (d) containing tungsten oxide-tin oxide-silicon dioxide composite colloidal particles (B2) in a ratio of 0.02 to 1 based on the mass ratio of (B2)/(A1) as converted into these metal oxides, and aging the obtained aqueous medium at 20 to 100° C. for 0.1 to 50 hours to yield the aqueous sol; and
- step (f'): after step (e'), replacing an aqueous medium of the aqueous sol obtained in step (e') containing modified zirconium oxide-tin oxide composite colloidal particles (C'), with an organic solvent.

* * * * *